March 31, 1964 M. I. COHN ET AL 3,127,242
METHOD OF TREATING MAGNESIA
Filed March 12, 1963
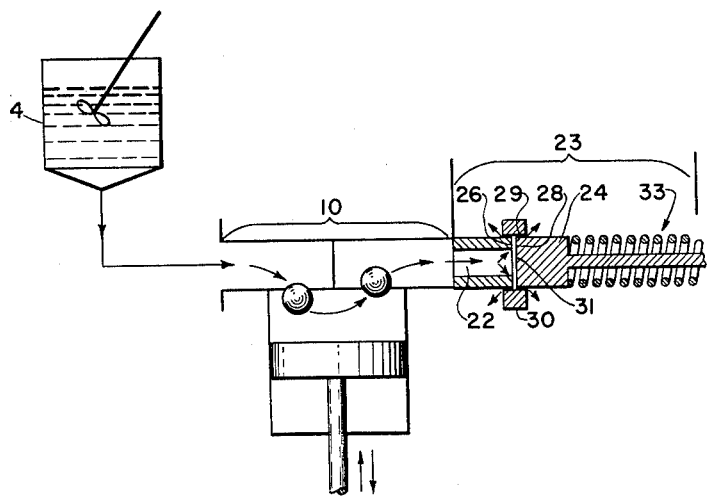
INVENTOR.
MORRIS I. COHN
ROY D. PERDUE
BY
*Dike, Thompson, Bronstein & Mrose*
ATTORNEYS 3,127,242
METHOD OF TREATING MAGNESIA
Morris I. Cohn, Needham, and Roy D. Perdue, Tewksbury, Mass., assignors to Mineral Industries Corporation of America, Needham, Mass., a corporation of Massachusetts
Filed Mar. 12, 1963, Ser. No. 269,830
2 Claims. (Cl. 23—201)

This application relates to the conversion of magnesia, particularly relatively unreactive magnesia, to magnesium hydroxide and is a continuation-in-part of our application Serial No. 4,599, filed January 26, 1960, now abandoned. Magnesium hydroxide produced in accordance with this invention can then be converted to magnesia of high reactivity, hereinafter called activated magnesia. The activated magnesia thus produced can have higher reactivity than the magnesia initially used as a starting material.

For example, dead burnt magnesia, chemical formula: MgO, as produced from sea water and other sources is an extremely unreactive material used extensively in the manufacture of refractories. As is well known, this form of magnesium oxide does not readily hydrate or dissolve quickly in dilute mineral acids. It is stable to at least 1700° C. In powdered form, this material has a bulk density of 70 to 80 pounds per cubic foot. Because of its inert and unreactive nature, dead burnt magnesia has no commercial value as an adsorbent.

Active magnesia, also called light calcined magnesia, is another physical form of magnesium oxide having very different properties. When placed in water, it hydrates rapidly to magnesium hydroxide. Active magnesia dissolves in dilute mineral acid in a matter of minutes. At 1700° C. It converts quickly to the dead burnt form. In powdered form, active magnesia has a bulk density of from five to 30 pounds per cubic foot depending on the method of activation. While the active form of magnesium oxide is not in short supply, it costs from three to six times more than the dead burnt grades of magnesia because of the more costly manufacturing techniques required for the product in the active form.

Active magnesia has useful adsorptive properties which make it commercially useful in the regeneration of dry cleaning solvents and a variety of other applications. Moreover, the combination of its adsorptive and reactive properties makes active magnesia useful in the compounding of neoprene rubber. In such applications, it serves as an adsorbent of polymer degradation products produced during high temperature mixing and forming of the stock, i.e., as an "anti-scorch agent," and later serves as a vulcanizing agent when the neoprene compound is cured.

Certain grades of active magnesia, when hydrated, yield hydroxides which display thixotropic properties. Such grades are useful in dip-coating steel and in other coating operations. The magnesium hydroxide thus deposited can by application of heat be again converted to magnesium oxide leaving a white, inert protective coating. Magnesium hydroxide produced from sea water by conventional means, while cheap, does not exhibit such thixotropic properties at the low percent solids concentrations required for economical operation.

"Thixotropic" means that property of existing in the form of a gel while not subjected to disturbances such as shaking but of becoming relatively fluid when subjected to such disturbances and of reverting back to a gel condition upon removal of such disturbances.

The reasons why active magnesia has such different properties from dead burnt and other grades of relatively unreactive magnesia have not been definitely established. So far as is known, except for co-occurring impurities, the magnesias are chemically the same.

Active magnesias are produced by one of several costly techniques usually involving a very closely controlled precipitation of magnesium hydroxide, magnesium carbonate, or basic magnesium carbonate followed by dewatering by filtration or other means, and drying of the slimy precipitate, which is difficult to handle. A critical light calcination step then follows. This step involves heating the precipitate sufficiently to drive off chemically combined water (in the case of magnesium hydroxide) or carbon dioxide (in the case of magnesium carbonate) or both (in the case of basic magnesium carbonate), but not heating sufficiently to "dead burn" the residual magnesium oxide. The resulting form of MgO is called active magnesia and displays the properties which are so very different from the dead burnt material.

It is an object of this invention to provide a method of activating magnesia which does away with the costly controlled precipitation step described above and which avoids the difficult filtration of the slimy precipitate.

It is a further object to produce a grade of active magnesia which, when placed in water, will quickly hydrate to form a type of magnesium hydroxide having superior thickening and thixotropic properties at a solids concentration of between 10% and 25% MgO by weight or less, e.g. 8%.

It is a further object to produce a grade of active magnesia which will have advantageous reactive properties such as in the compounding of rubber and in other applications where chemical reactivity is important.

It is a further object of this invention to produce an active magnesia product simply and inexpensively, using relatively inexpensive and abundant less active magnesium oxide and water as the only raw materials.

Yet another object is to provide a unique and novel method of hydrating magnesium (magnesium oxide) to magnesium hydroxide. By removing water from such magnesium hydroxide, it is converted into a highly active magnesia even when the original magnesia before hydration is relatively inactive, e.g. dead burnt magnesia.

All these objects are achieved in accordance with the present invention by forcing an aqueous slurry of magnesia particles in the form of a film edgewise through a thin, hard-surfaced gap under a high pressure of at least 100 pounds per square inch and at a high velocity by virtue of reduction of said pressure to a lower pressure. This converts the magnesia into magnesium hydroxide which when converted to magnesia by removal of water provides a highly reactive magnesia product even where the original magnesia was relatively unreactive, e.g. dead burnt magnesia.

One embodiment of the invention consists of making a slurry of dead burnt magnesia in water and pumping the slurry at an elevated temperature near or at the boiling point through one or more homogenizing valves a plurality of times under high pressures, preferably about 2000 p.s.i. or higher. Between successive passes, it is preferable to hold the slurry at or near the atmospheric boiling point for a number of hours during which conversion to the hydroxide occurs.

The approaching completion of conversion of the dead burnt magnesia to a hydroxide of active magnesia is indicated by a thickening of the slurry to a thixotropic gel. Such thickening is not due to evaporation of water because the percent solids remains practically constant through the addition of water from time to time to replace that lost both by evaporation and chemical combination with the magnesia. Substantial completion of conversion to the hydroxide is indicated by an approximate 30.5 to 30.8% loss on ignition of a dried sample of the gelled slurry corrected for any known unreactive impurities. However, conversion need not be wholly completed to derive the benefits of this invention. It may be only partially completed in which case the resulting slurry will not be thixotropic and consequently the loss on ignition will be lower than that stated above. However, with dead burnt magnesia, it is preferable that there be sufficient conversion to cause the slurry to become thixotropic.

Loss on ignition means the percent loss in weight of a dried sample of hydroxide heated to at least 850° F. This loss in weight is a measure of the chemically combined water present as hydroxyl water in the magnesium hydroxide and hence is a measure of the conversion of the dead burnt magnesia to the hydroxide of activated magnesia.

Upon substantially complete conversion of the dead burnt magnesium oxide to the hydroxide of active magnesia, the slurry is dewatered on a filter and dried. The hydroxide is not slimy, is easy to handle, and dewaters easily and quickly. It is greatly different in these properties from conventional sea water hydroxides. The ready filtration of the hydroxide thus produced permits easy washing on the filter which further removes some of the soluble impurities normally present in these materials. This is achieved only with great difficulty with conventional hydroxides due to their slimy consistency.

The filter cake is dried and then subjected to light calcination. The details of the drying and calcination steps are well known to those skilled in the art. Normally, neoprene grades of active MgO are obtained from calcination of magnesium hydroxide as completely to the oxide as is commercially practical, recognizing that due to uneven heat transfer and other unavoidable conditions, some hydroxide will remain and some dead burning will occur. A 5 to 10% ignition loss on the product discharged by the calciner is not uncommon.

Concerning the foregoing broadly described process we have found that certain variables and methods of operation are important if all of the objects of the invention are to be met. Certain conditions which are important with dead burnt magnesia are not necessary with other magnesia feeds which are not as unreactive, e.g. moderately burned magnesia.

With dead burnt magnesia, the concentration of dead burnt magnesia in the feed slurry pumped to the homogenizer and boiled is an important variable. The preferred maximum concentration of dead burnt MgO in the aqueous slurry is 10% by weight although concentrations as high as 25% by weight have produced a thick and thixotropic slurry of a hydroxide having the desired properties. These properties can be only qualitatively described as follows: that the dried hydroxide thus formed will be of such a nature that light calcination to active magnesia and subsequent rehydration to the hydroxide by mixing with water will again produce a thick, thixotropic slurry of magnesium hydroxide of active magnesia with a solids concentration as low as between 10% and 25% by weight and lower, e.g., 8%. Thus to achieve the greatest advantage of the invention with dead burnt magnesia the maximum concentration of dead burnt magnesia in the feed slurry to the homogenizing valve should be about 25% by weight but a preferred maximum is 10% by weight. A concentration of between about 8% and 20% and lower, e.g., 6%, has been found to be suitable. In some instances the concentration may be as low as ½%.

Concerning certain economies of operation, it is possible to pump the slurry of dead burnt magnesia at as high as 50% solids by weight to initiate the hydration reaction. However, before the batch is completed, it is preferable to dilute it to a concentration of 25% or less and pass it an additional number of times through the homogenizing valve. With feed slurry concentrations of dead burnt magnesia of much greater than 25% by weight the product obtained is different in thixotropic properties and is not as useful for some purposes as for others.

It has been found that the slurry of dead burnt magnesia should not only be subjected to the action of the homogenizing valve or valves a certain number of times but should also be subjected to at or near boiling temperatures (about 90° C. or 95° C. or more at atmospheric pressure) for a number of hours, preferably not much less than three. However, it has been found that five or six hours or more produce the best results. The slurry can either be continuously recycled through the homogenizing valve at such temperatures during this entire time or it can be subjected to such temperatures for all or a substantial portion of this entire time between successive passes, i.e., while it is not being subjected to the action of the valve. However, where the slurry of dead burnt magnesia is subjected to elevated temperatures while not being pumped through the valve, it should be subsequently passed through the valve and preferably subjected to such temperatures again while not being passed through the valve. In a preferred embodiment, it is subjected to these temperatures during the passes as well as during a substantial time between and after the passes.

There appears to be no advantage in continuously passing the slurry of dead burnt magnesia through the homogenizing valve during the entire hydration process. For example, a 10% slurry passed sixty times consecutively through the valve hydrates and thickens no faster than a batch given twenty consecutive passes through the valve so long as the total time during which the slurry is subjected to the elevated temperatures is adequate and is the same. Increasing the pumping pressure to 5000 p.s.i. shortens the time required for thickening of the batch but not materially. The lesser time required cannot be justified in terms of more than doubling the power costs of pumping and increased maintenance costs due to wear and tear on the pump packing and parts.

The minimum number of passes required to complete hydration for a slurry of dead burnt magnesia is the minimum number at which the resulting slurry will have the desired thickness or consistency and thixotropic properties when boiled and can be easily determined by routine tests and observation. This is also true of the minimum total time during which the slurry must be subjected to boiling temperatures, as referred to above, to complete hydration. It has been found that a total number of passes of between 10 and 30 gives good results although with 10 passes the results are not as good as with 30 passes. However, as few as 5 passes will give beneficial results. The minimum number of passes is dictated only by economic factors.

A preferred method of operation when employing dead burnt magnesia is to pass the slurry 10 to 15 consecutive times through the homogenizing valve or valves maintaining the temperature of the batch fed to the homogenizing pumps and valve assemblies at between about 90° C. and 100° C. or above (about atmospheric boiling temperature) followed by boiling at the atmospheric boiling point preferably between about 2 to 6 hours while it is not being passed through the valve. Water to replace that lost by evaporation and chemically combined with the magnesia as hydroxyl water is added to the batch from time to time to keep the total slurry volume about the same. The batch is then subjected to an additional 5 to 15 consecutive passes through the valve at the same temperature followed by an additional period of atmoshperic boiling of up to six hours without passage through the valve. The second set of passes should be at the preferred concentration of between 10% and 20% or less of dead burnt magnesium oxide by weight. If convenient and economical, the first set of passes should be at this concentration as well to develop maximum thickening and thixotropic properties of the hydroxide.

When operating on dead burnt magnesia, although it is preferred to pass the slurry to the homogenizing pump and valve assembly at or near its atmospheric boiling point, it can be passed to the assembly cold or at an elevated temperature less than the atmospheric boiling point. The conversion of the dead burnt magnesia to the hydroxide of active magnesia is exothermic and hence, when the slurry is passed to the homogenizing valve at or near the boiling point, may raise the temperature of the slurry in some cases above the atmospheric boiling point while it is under pressure in the valve. Thus, even if the slurry is at a temperature of let us say 75° C., atmospheric boiling point temperatures and higher may be achieved in the valve. In any event, better results have been obtained by feeding the slurry to the homogenizing pump and valve assembly at elevated feed temperatures without relying on exothermic heat alone.

As a matter of fact, in a preferred embodiment, when treating dead burnt magnesia, the slurry is reheated between each pass to about the atmospheric boiling point (between about 90° C. and 100° C. or above) or at some lower temperature where exothermic heat is being relied upon in part.

As set forth above, in addition to reheating between each pass, the slurry, after it has been passed through one or more homogenizing valves one or more times, is preferably subjected to temperatures at or near atmospheric boiling for a substantial period (hereinafter referred to as a boiling period) greater than that merely necessary to reheat the slurry. After this boiling period, the boiled slurry is again passed through the same or different homogenizing valves one or more times followed by another boiling period. Boiling periods of between 1 and 6 hours are satisfactory as long as the total of the boiling periods is adequate. As many boiling periods as desired can be used between passes but at least two are preferred, one between passes and one subsequent to the last pass, unless the slurry is continuously passed through the valve during the entire minimum boiling time as set forth above. If the slurry is maintained under pressure between passes, the boiling temperature will be higher and consequently the slurry can be maintained at a higher temperature during the heating periods between passes and when it is fed to the homogenizing pump and valve.

Although particle sizes of burnt magnesia passing a 60-mesh screen are preferred, particle sizes which pass a 10-mesh screen can be used. Particle sizes which are smaller than those passing a 60-mesh screen are easier to process.

The treatment described above is for dead burnt magnesia which is a highly inert (unreactive) type of magnesia. In treating less unreactive magnesias, i.e. magnesias having reactivity between that of active magnesia and dead burnt magnesia, temperatures need not be as high, e.g. the slurry feed to the homogenizing pump and valve assembly may be cold, i.e. room temperature, with no heating between passes or after the final pass, pressures may be lower, and the number of passes may be fewer, e.g. advantageous effects may be achieved with only one pass and with no boiling before or after passing the slurry through the homogenizing pump and valve assembly, i.e., before the initial pass, after the final pass or between passes. Even with dead burnt magnesia, these less intense conditions will produce some hydration, the more intense conditions referred to above with respect to dead burnt magnesia being directed toward accomplishing substantially complete hydration.

An example of a magnesia having reactivity between that of dead burnt magnesia and active magnesia is a magnesia derived from magnesite, naturally occurring magnesium carbonate, which in some cases will not hydrate to any appreciable extent or in a reasonable period of time by simply suspending it in water at room temperature or elevated temperatures. Pumping an aqueous slurry of this type of magnesia through one or more homogenizing valves once or a plurality of times at concentrations ranging from a fraction of a percent by weight to the maximum concentration which the valve can physically handle (a particular concentration found suitable is 50% by weight) greatly accelerates the hydration of the magnesia to magnesium hydroxide without the use of elevated temperatures, i.e. without applying heat. Thus with such magnesias boiling is not required and there is no limiting concentrations other than those dictated by the capacity of the pumps and valves to handle the slurry and the fact that very low concentrations are not economical. Improved hydration occurs with only one pass through one valve. Furthermore, with some magnesias, completion of hydration or substantially complete conversion of the magnesia to magnesium hydroxide as determined by loss on ignition may not be accompanied by thixotropy. However, the hydroxide thus produced can be readily filtered, dried, and lightly calcined to produce an exceedingly active magnesia substantially more active than the original magnesia before treatment as evidenced by standard iodine adsorption tests, rates of rehydration and reaction with acids.

As stated in the following examples, the homogenizing pump and valve assembly, the pumping pressures, the flow rates and the slurry concentrations may be the same as those disclosed in our co-pending application Serial No. 197,813, filed May 7, 1962, which is a continuation of our application Serial No. 782,992, now abandoned, and in our Patent No. 3,039,703. Thus, as set forth on page 12 of said co-pending application, in certain special cases the pressure may be as low as 100 pounds per square inch. Said co-pending application also refers to more preferable pressures from about 500 and 600 pounds per square inch to 6,000 pounds per square inch, although as stated above, pressures of about 2,000 pounds and greater are preferred.

FIG. 1 is a diagrammatic view of the homogenizing pump and valve assembly of said co-pending application and is the same as FIG. 3 of said application.

In FIG. 1, 4 is the slurry tank to which water and dead burnt or other magnesias are added, stirred and heated if necessary (when dead burnt magnesia is used) to form the slurry feed (hot in the case of dead burnt magnesia). The slurry feed is fed into the pump unit 10 which pumps it at a high pressure to a passage 22 of the homogenizing valve assembly 23 and against valve 24 which is urged toward valve seat 26 by a heavy spring 33. The high pressure exerted on the valve 24 by the slurry in the confined passage 22 forces the valve slightly away (a fraction of an inch) from its seat 26 whereby the slurry under pressure flows at an extremely high velocity through the highly restricted valve opening 28 formed by the closely spaced valve seat 26 and valve face 31 against an annular impact ring 30 etxending around the valve. The slurry then flows through the narrow passage 29 formed by the closely spaced impact ring 30 and outer peripheries of the valve and valve seat, such valve seat, valve face, impact ring, and outer peripheries being made of a very hard material such as tungsten carbide. It is believed that the turbulence and cavitation of the slurry as it flows through opening 28 against impact ring 30 and through passage 29, the impact of the slurry against the impact ring and valve face 31 and the extremely high velocity of the slurry through the highly restricted valve opening 28 in the form of a thin film all contribute to the advantageous results achieved. The various changes in directional flow of the slurry from 22 to 28 and from 28 to 29 also probably contribute to such results.

The distance between the valve seat surface 26 and the valve face 31 is the same as that disclosed in our above-mentioned co-pending application. As set forth on page 12 of that application, opening sizes in the nature of between about .001 and .005 inch (less than .010 inch) are typical. The lower limit is dictated only by practical considerations. Opening sizes greater than about .090 inch require such a high pumping rate or such a small diameter of passage 22 to achieve adequate velocity through opening 28 that they are not commercially practical. In fact, opening sizes greater than .050 inch are difficult to use although in certain cases and under certain conditions, some advantageous results may be achieved with opening sizes as large as about 0.10 inch.

While a preferred embodiment includes the annular impact ring 30, improved hydration and activation can be achieved without it.

EXAMPLE 1

Equipment

A Manton-Gaulin laboratory homogenizer delivering approximately 1 quart/minute and fitted with a standard homogenizing valve assembly complete with impact ring and shown in our above mentioned co-pending application. The dimensions of the homogenizer, e.g., width and length of the valve opening, the opening between the impact ring and periphery of the valve, etc., are the same as those set forth in the above mentioned application. Also the same ranges of flow rates and pressures can be used. Preferably, in the present application the pressure is no greater than 5000 pounds per square inch for economical reasons only. It is intended that the above mentioned co-pending application be incorporated into this application by reference.

Raw Materials 2700 grams tap water and 300 grams Michigan Chemical Company Dead Burnt Magnesite (MgO) hammer milled and screened to pass 60 mesh.

Procedure

The water was charged to the feed tank of the homogenizer. A power agitator was used to stir the contents of the feed tank. The minus 60 mesh MgO was added to the water slowly while it was agitated to form a 10% slurry by weight. The smaller the initial particle size, the smoother the operation of the homogenizer. The slurry in the tank was heated to 95° C. by means of a hot plate placed under the feed pan. The hot slurry was fed to the inlet of the pump and valve assembly of the homogenizer and the homogenizer discharge was recycled back to the feed tank and thence through the homogenizer again and back to the feed tank. The pumping pressure was 2000 p.s.i. The slurry was recycled through the homogenizing valve and feed tank for 45 minutes. Since the homogenizer pumped the slurry at approximately 950 cc. per minute, the original contents of the feed tank were passed through the homogenizing valve on an average of fifteen times. The heat applied to the slurry while it was in the feed tank maintained the slurry at the elevated temperature. The resulting slurry was passed into a beaker and boiled at atmospheric pressure for six hours. Some thickening was noted, but in general, the milky slurry was quite fluid. The boiled slurry was again recycled through the homogenizer and feed tank at a pressure of 2000 p.s.i. for another 45 minutes (about 15 times). The resulting slurry was boiled again in a beaker until a thick and thixotropic milk of magnesia slurry formed; this latter step required six hours. The hydroxide thus formed dewatered on a Buchner filter funnel readily and was easily repulped and again dewatered to remove soluble impurities. The dried hydroxide was lightly calcined in a metal beaker placed on a hot plate having a surface temperature of 1000–1200° F. to yield an active MgO product having a bulk density of 10 pounds per cubic foot and excellent thixotropic properties and anti-scorch properties in neoprene. When the MgO product was again mixed with water at a 10% concentration by weight, it formed a thick, thixotropic suspension like that obtained at the end of the last boiling step.

EXAMPLE 2

Equipment

Same as in Example 1.

Raw Materials 2250 grams tap water at room temperature (25° C.) and 750 grams of magnesia sold by Basic Incorporated under the name Magox (MgO). This MgO has 99% by weight passing at 325 mesh sieve and 80% by weight having a particle size less than 10 microns. It analyses 96% minimum MgO and is derived from naturally occurring magnesite ($MgCO_3$) by light burning. The initial Magox had a loss on ignition of 2.39% and an iodine number of 6.8, i.e., 6.8 milli-equivalents of iodine are adsorbed by 100 grams of Magox. Iodine number determination is commonly employed to determine the adsorptive capacity of active magnesias, which is a measure of its reactivity.

Procedure

The water was charged to the feed tank 4 of the homogenizer. A power agitator was used to stir the contents of the feed tank. The MgO (Magox) was added to the water slowly (over a period of 15 minutes) to form a 25% by weight slurry. No heat was applied to the slurry. The slurry was then fed to the inlet of the pump and valve assembly of the homogenizer of FIG. 1 and the homogenizer discharge was collected. The pumping pressure was 2000 p.s.i. Upon completion of one pass through the homogenizer, the discharge was placed back in the feed tank and the slurry was passed again at 2000 p.s.i. pumping pressure, collecting the homogenizer discharge. This procedure was repeated until the slurry was subjected to 10 passes in all which required approximately 30 minutes. No external heat was applied to the slurry at any time.

The MgO slurry, after 10 passes, was immediately dewatered on a Buchner filter funnel to form a filter cake which was removed from the funnel and dried in a laboratory oven for exactly 2 hours at 100° C.

A second run (run 2) was made exactly like the first except that the impact ring 30 was removed whereas it was present in run 1. Thus, in run 2 the forces of shear and cavitation exerted on the thin film of slurry within the gap between the valve seat 26 and valve face 31, i.e., opening 28, were not supplemented by further impact of the slurry.

Loss on ignition determinations (loss on ignition is a measure of the conversion to hydroxide) were performed on the dewatered and dried slurry solids. Iodine number determinations (iodine number is a measure of the activity of the magnesium oxide) were also performed on such solids after first lightly calcining them for 3 hours at 900° F. to dehydrate them. These determinations are listed in Table I.

To compare the effect of the pressure homogenizer in runs 1 and 2 with merely suspending the Magox in water at the same solids concentration, a 25% slurry of the raw material was agitated at 25° C. (about room temperature) for one hour (less than the total time during which the Magox in runs 1 and 2 remained in water). The sample was dewatered and dried in the same manner as the slurries of runs 1 and 2. Loss on ignition of the dewatered, dried sample was determined and also the iodine number of the dewatered, dried sample was determined after light calcining for three hours at 900° F. to dehydrate it. These losses on ignition and iodine number determinations are listed in Table I:

TABLE I.—LOSS ON IGNITION AND IODINE NO. DATA OF SOLIDS PASSED THROUGH HOMOGENIZER AND DRIED IN RUNS 1 AND 2 AS DESCRIBED IN EXAMPLE 2 AND OF COMPARISON SAMPLE SUBJECTED ONLY TO TREATMENT WITH WATER

| Sample | Loss on Ignition (percent) | Iodine No. |
|---|---|---|
| Feed (no treatment in homogenizer) | 2.39 | 6.82 |
| Comparison Sample | 5.25 | 23.2 |
| Run 1—With impact ring | 12.8 | 51.9 |
| Run 2—Without impact ring | 10.4 | 37.4 |

The solids collected from run 1 where much whiter than the solids collected from run 2.

It is noted that greater hydration and a more active magnesium oxide were obtained with the impact ring as compared to without such ring but that hydration and activity were substantially increased, as compared to treatment of the feed solids with water without passing them through the homogenizing valve, even without the impact ring.

Even greater hydration and greater increases in activity can be achieved by increasing the number of passes.

Although treatment in accordance with the present invention at room temperatures as per Example 2 does not provide as much hydration and does not increase activity as much as with the use of elevated temperatures, e.g. with elevated temperatures as per Example 1 loss on ignition as high as 30% can be achieved, nevertheless advantageous results are obtained.

It is noted that magnesium hydroxide derived from sea water (such as Dow Technical Magnesium Hydroxide 100) when subjected to the same homogenizing and boiling procedures as described in Example 1 did not show any thickening and development of thixotropic properties. Moreover, the initial bulk density of the hydroxide was 27.5 pounds per cubic foot. After 60 passes through the homogenizing valve and boiling for 40 hours, the bulk density increased to 37.0 pounds per cubic foot and there was no thickening of the hydroxide. When the agitator was removed, the hydroxide settled to the bottom of the beaker, leaving a clear supernatant liquid. Thus, merely passing a magnesium hydroxide slurry through a homogenizing valve does not accomplish any of the objects of the invention.

The recitation in the claims hereof that the slurry is passed through a homogenizing valve a plurality of times includes (1) passing the slurry through the same valve a plurality of times, (2) pasing the slurry through a plurality of different valves in series, and (3) a combination of both.

The homogenizing pump and valve assembly disclosed in our U.S. Patent No. 3,039,703 can be used.

We claim:

1. A method of hydrating magnesia to produce magnesium hydroxide comprising forcing an aqueous slurry of magnesia particles in the form of a film edgewise through a thin hard-surfaced gap under a high pressure of at least 100 pounds per square inch and at a high velocity by virtue of reduction of said pressure to a lower pressure against a hard impact surface.

2. A method of hydrating magnesia to produce magnesium hydroxide comprising forcing an aqueous slurry of magnesia particles in the form of a film edgewise through a thin hard-surfaced gap under a high pressure of at least 100 pounds per square inch and at a high velocity by virtue of reduction of said pressure to a lower pressure.

References Cited in the file of this patent

UNITED STATES PATENTS

| | | |
|---|---|---|
| 1,934,637 | Rafton | Nov. 7, 1933 |
| 2,386,027 | Wing | Oct. 2, 1945 |
| 2,419,204 | Elkington et al. | Apr. 22, 1947 |
| 2,478,593 | Pike | Aug. 9, 1949 |
| 2,885,154 | Eastman et al. | May 5, 1959 |